United States Patent
Lim et al.

(10) Patent No.: US 10,797,815 B1
(45) Date of Patent: Oct. 6, 2020

(54) RADIO GENRE ENHANCEMENT USING CROWD-SOURCED LISTENER DATA

(71) Applicant: FORD GLOBAL TECHNOLOGIES, LLC, Dearborn, MI (US)

(72) Inventors: Jae Hyung Lim, Canton, MI (US); Jeremy Lerner, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/381,385

(22) Filed: Apr. 11, 2019

(51) Int. Cl.
| | | |
|---|---|---|
| *H04H 60/73* | (2008.01) | |
| *G06F 3/16* | (2006.01) | |
| *H04H 60/65* | (2008.01) | |
| *H04H 60/31* | (2008.01) | |
| *H04H 60/90* | (2008.01) | |

(52) U.S. Cl.
CPC ............. *H04H 60/73* (2013.01); *G06F 3/165* (2013.01); *H04H 60/31* (2013.01); *H04H 60/65* (2013.01); *H04H 60/90* (2013.01); *H04H 2201/13* (2013.01)

(58) Field of Classification Search
None
See application file for complete search history.

(56) References Cited

U.S. PATENT DOCUMENTS

| | | | |
|---|---|---|---|
| 7,840,178 B2 | 11/2010 | Hellman | |
| 2007/0248055 A1 | 10/2007 | Jain et al. | |
| 2010/0100310 A1* | 4/2010 | Eich | G08G 1/096872 |
| | | | 701/533 |
| 2015/0195054 A1 | 7/2015 | Fischer et al. | |
| 2018/0067939 A1* | 3/2018 | St. Thomas | G06Q 30/0204 |

* cited by examiner

*Primary Examiner* — Walter F Briney, III
(74) *Attorney, Agent, or Firm* — Michael J. Spenner; Brooks Kushman P.C.

(57) ABSTRACT

A memory is configured to store listener data indicative of radio stations listened to by a plurality of listeners and genre classifications of the radio stations. A processor is programmed to combine a plurality of the genre classifications into a single combined genre classification responsive to listener behavior across the plurality of listeners indicating overlap in listening to the plurality of the genre classifications; separate one of the genre classifications into a plurality of separated genre classifications responsive to listener behavior across the plurality of listeners indicating disparate subsets of radio stations within the one of the genre classifications; and reclassify the radio stations according to the genre classifications as updated.

17 Claims, 3 Drawing Sheets

300

|  | Adult Hits 1 | Adult Hits 2 | Adult Hits 3 | Adult Contem 1 | Adult Contem 2 |
|---|---|---|---|---|---|
| Listener 1 | 1 | 1 | 1 | 1 | 1 |
| Listener 2 | 1 | 1 | 1 | 1 | 1 |
| Listener 3 | 1 | 1 | 0 | 1 | 1 |
| Listener 4 | 0 | 1 | 1 | 1 | 1 |
| Listener 5 | 0 | 0 | 0 | 0 | 0 |
| Listener 6 | 0 | 0 | 0 | 0 | 0 |

|  | News 1 | News 2 | News 3 | News 4 | News 5 |
|---|---|---|---|---|---|
| Listener 1 | 1 | 1 | 0 | 0 | 0 |
| Listener 2 | 1 | 1 | 0 | 0 | 0 |
| Listener 3 | 0 | 1 | 0 | 0 | 0 |
| Listener 4 | 0 | 0 | 1 | 1 | 0 |
| Listener 5 | 0 | 0 | 0 | 1 | 1 |
| Listener 6 | 0 | 0 | 1 | 1 | 1 |

RADIO GENRE ENHANCEMENT USING CROWD-SOURCED LISTENER DATA

TECHNICAL FIELD

Aspects of the disclosure generally relate to enhancing genre classification of radio stations by analyzing crowd-sourced listener data.

BACKGROUND

Radio stations typically play programming within a single genre. For instance, one radio station may play jazz music, while another may play classical music. Listeners have preferences about which genres of programming they would like to hear. However, current genre classifications of radio stations are of poor quality or may be too broad to be useful.

SUMMARY

In one or more illustrative examples, a system includes a memory configured to store listener data indicative of radio stations listened to by a plurality of listeners and genre classifications of the radio stations. The system also includes a processor programmed to combine a plurality of the genre classifications into a single combined genre classification responsive to listener behavior across the plurality of listeners indicating overlap in listening to the plurality of the genre classifications; separate one of the genre classifications into a plurality of separated genre classifications responsive to listener behavior across the plurality of listeners indicating disparate subsets of radio stations within the one of the genre classifications; and reclassify the radio stations according to the genre classifications as updated.

In one or more illustrative examples, a method includes receiving, from a plurality of vehicles, listener data indicative of radio stations tuned to by radios of the respective vehicles, each of the radio stations being classified according to one of a plurality of genre classifications; generating, from the listener data, a map specifying usage values for each combination of vehicle and radio station; combining a plurality of the genre classifications into a single combined genre classification responsive to the map indicating overlap above a predefined threshold amount among the plurality of vehicles in listening to the plurality of the genre classifications; separating one of the genre classifications into a plurality of separated genre classifications responsive to the map indicating disparate subsets of radio stations within the one of the genre classifications with overlap below a second predefined threshold amount; and sending the genre classifications as updated to the plurality of vehicles.

In one or more illustrative examples, a non-transitory computer readable medium comprising instructions that, when executed by a processor, cause the processor to receive, from a plurality of vehicles, listener data indicative of radio stations tuned to by radios of the respective vehicles, each of the radio stations being classified according to one of a plurality of genre classifications; generate, from the listener data, a map specifying usage values for each combination of vehicle and radio station; combine a plurality of the genre classifications into a single combined genre classification responsive to the map indicating overlap among the plurality of vehicles in listening to the plurality of the genre classifications; separate one of the genre classifications into a plurality of separated genre classifications responsive to the map indicating disparate subsets of radio stations within the one of the genre classifications; and send the genre classifications as updated to the plurality of vehicles.

BRIEF DESCRIPTION OF THE DRAWINGS

FIG. 3 illustrates an example map illustrating commonality of listening to disparate genre classifications according to the listener data; and FIG. 4 illustrates an example of a map illustrating multiple clusters of listening in a single genre classification according to the listener data.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Available databases for radio station genres or formats are of poor quality. That is, there are many genres that are too coarse. For example, regarding news stations, broadcasts may be more logically divided into two or more sub-classifications (e.g., liberal and conservative). If a listener with a pattern of listening to a liberal radio stations is recommended a conservative station, the listener will assume the recommendation is poor. Additionally, some genres are too fine. For example, some stations are categorized as "Adult Hits" which may be indistinguishable by the listener from "Adult Contemporary." Similarly, classifications such as "Rock—All New," "New Rock," "Active Rock," and "Rock" may involve substantial overlap.

Using listener data from connected vehicles, coarse genres may be split up and overly-narrow genres may be condensed. More specifically, the histories of the listener data may be used to associate genres together when many stations share users. That is, if many listeners of "Rock" stations also listen to "New Rock" stations, the two genres probably overlap significantly enough to be considered the same. Additionally, if many listeners of a subset of "News" stations substantially never listen to a mutually exclusive subset of news stations, those subsets are probably actually two distinct genres.

As a further enhancement, a set of well-labeled radio stations may be used to intelligently identify the true classification of subsets. This may be used to aid in the labeling of identified subsets of unknown difference. For example, if a locality has six news stations, where one or more are known to be liberal and one or more are known to be conservative, that information may be used to accurately label the subsets of a divided classification. Thus, an additional source of data related to station classification may be used as a starting point to clarify a radio station's true genre.

Figure 1:
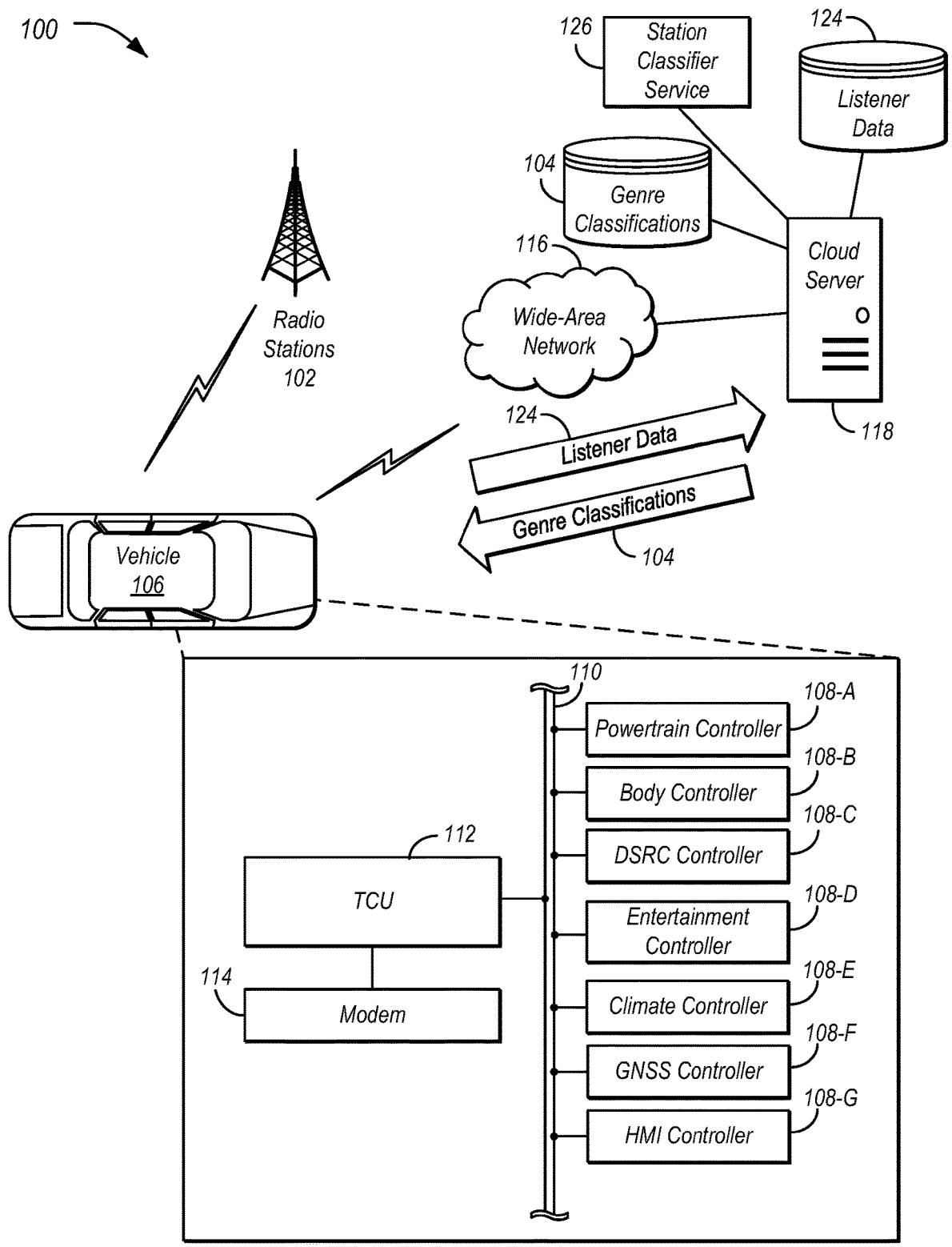
FIG. 1 illustrates an example system for the enhancement of radio genre classifications for radio stations according to an analysis of listener data.

FIG. 1 illustrates an example system 100 for the enhancement of radio genre classifications 104 for radio stations 102 according to an analysis of listener data 124. As illustrated, radio stations 102 broadcast media content that may be classified according to genre classifications 104. A vehicle 106 include a plurality of vehicle electronic control units (ECUs) or controllers 108 in communication over one or more vehicle buses 110. An entertainment controller 108-D of the vehicle 106 may generate listener data 124 including a history of which radio stations 102 were listened to by a user, and a telematics control unit (TCU) 112 of the vehicle 106 may provide the listener data 124 to a cloud server 118. The cloud server 118 may be configured to receive the listener data 124 from the vehicles 106 and execute a radio station classifier service 126 to update genre classifications 104 based on the listener data 124 received from the vehicles 106. The cloud server 118 may provide the updated genre classifications 104 back to the vehicles 106.

The radio stations 102 may include one or more sources of media content. In many examples, the radio stations 102 transmit the media content via broadcast over radio waves. Radio signals may be in various formats, such as amplitude modulated (AM), frequency modulated (FM), analog, or digital. Some radio stations 102 use terrestrial transmitters to broadcast media content, while other radio stations 102 use other mechanisms for transmission, such as satellites for satellite radio or the Internet for internet radio.

The radio stations 102 may also broadcast or otherwise be linked to genre classifications 104 indicative of the types of media content broadcast by the radio stations 102. For instance, radio data system (RDS) is a communications protocol standard for embedding small amounts of digital information in conventional FM radio broadcasts, and standardizes several types of information transmitted, including time, station identification, and program information. RDS may, therefore, be an example of a source of genre classifications 104.

The vehicle 106 may include various types of automobile, crossover utility vehicle (CUV), sport utility vehicle (SUV), truck, recreational vehicle (RV), boat, plane or other mobile machine for transporting people or goods. In many cases, the vehicle 106 may be powered by an internal combustion engine. As another possibility, the vehicle 106 may be a battery-electric vehicle (BEV) powered one or more electric motors, a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 106 may vary, the capabilities of the vehicle 106 may correspondingly vary. As some other possibilities, vehicles 106 may have different capabilities with respect to passenger capacity, towing ability and capacity, and storage volume. For title, inventory, and other purposes, vehicles 106 may be associated with unique identifiers, such as VINs.

The vehicle 106 may include a plurality of controllers 108 configured to perform and manage various vehicle 106 functions under the power of the vehicle battery and/or drivetrain. As depicted, the example vehicle controllers 108 are represented as discrete controllers 108-A through 108-G. However, the vehicle controllers 108 may share physical hardware, firmware, and/or software, such that the functionality of multiple controllers 108 may be integrated into a single controller 108, and that the functionality of various such controllers 108 may be distributed across a plurality of controllers 108.

As some non-limiting vehicle controller 108 examples: a powertrain controller 108-A may be configured to provide control of engine operating components (e.g., idle control components, fuel delivery components, emissions control components, etc.) and for monitoring status of such engine operating components (e.g., status of engine codes); a body controller 108-B may be configured to manage various power control functions such as exterior lighting, interior lighting, keyless entry, remote start, and point of access status verification (e.g., closure status of the hood, doors and/or trunk of the vehicle 106); a DSRC transceiver controller 108-C may be configured to communicate with key fobs, mobile devices, or other local vehicle 106 devices; an entertainment controller 108-D may be configured to support voice command and BLUETOOTH interfaces with the driver and driver carry-on devices as well as to play content from radio stations 102 or other sources of media content; a climate control management controller 108-E may be configured to provide control of heating and cooling system components (e.g., compressor clutch, blower fan, temperature sensors, etc.); a global navigation satellite system (GNSS) controller 108-F may be configured to provide vehicle location information; and a human-machine interface (HMI) controller 108-G may be configured to receive user input via various buttons or other controls, as well as provide vehicle status information to a driver, such as fuel level information, engine operating temperature information, and current location of the vehicle 106.

The vehicle bus 110 may include various methods of communication available between the vehicle controllers 108, as well as between the TCU 112 and the vehicle controllers 108. As some non-limiting examples, the vehicle bus 110 may include one or more of a vehicle controller area network (CAN), an Ethernet network, or a media-oriented system transfer (MOST) network. Further aspects of the layout and number of vehicle buses 110 are discussed in further detail below.

The TCU 112 may include network hardware configured to facilitate communication between the vehicle controllers 108 and with other devices of the system 100. For example, the TCU 112 may include or otherwise access a cellular modem 114 configured to facilitate communication with a wide-area network 116. The wide-area network 116 may include one or more interconnected communication networks such as the Internet, a cable television distribution network, a satellite link network, a local area network, and a telephone network, as some non-limiting examples. As another example, the TCU 112 may utilize one or more of BLUETOOTH, Wi-Fi, or wired USB network connectivity to facilitate communication with the wide-area network 116 via the user's mobile device.

The TCU 112 and the controllers 108 may each include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, the processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc.

The cloud server 118 may include various types of computing apparatus, such as a computer workstation, a server, a desktop computer, a virtual server instance executed by a mainframe server, or some other computing system and/or device. Similar to the TCU 112, the cloud server 118 generally includes a memory on which computer-executable instructions may be maintained, where the instructions may be executable by one or more processors (not shown for clarity). Such instructions and other data may be stored using a variety of computer-readable media. In a non-limiting example, the cloud server 118 may be configured to maintain the genre classifications 104, listener data 124, and the station classifier service 126.

The listener data 124 may refer to historical information indicative of listener history to the one or more radio stations 102. In an example, the entertainment controller 108-D may capture and store information indicative of start and end times of which radio stations 102 have been listened to. This information may be provided to the TCU 112 over the vehicle bus 110 and transmitted to the cloud server 118 for analysis.

The station classifier service 126 may be an example of a software application installed to a memory (not shown) of the cloud server 118. When executed by one or more processors (not shown) of the cloud server 118, the station classifier service 126 may allow the cloud server 118 to analyze the listener data 124 among the different listeners to identify commonalties in the radio stations 102 that are listened to and update the genre classifications 104 based on the analysis.

Figure 2:
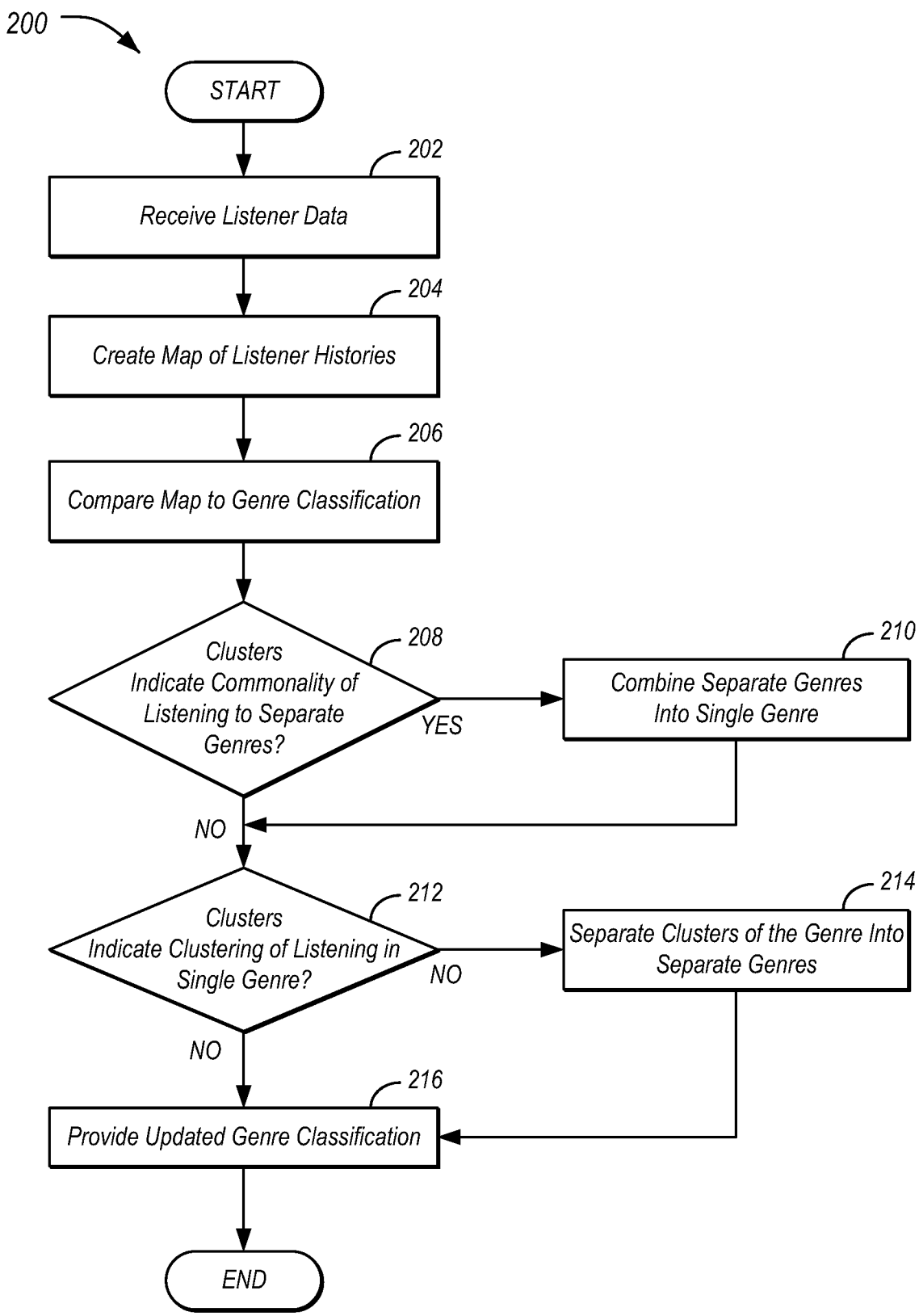
FIG. 2 illustrates an example process for the enhancement of radio genre classifications for radio stations according to an analysis of listener data.

FIG. 2 illustrates an example process 200 for the enhancement of radio genre classifications 104 for radio stations 102 according to an analysis of listener data 124. In an example, the process 200 may be performed by the cloud server 118 executing the station classifier service 126.

At 202, the station classifier service 126 receives listener data 124. In an example, the station classifier service 126 may cause the cloud server 118 to periodically request listener data 124 from the vehicles 106. In another example, the vehicles 106 may send their listener data 124 to the cloud server 118 responsive to the satisfaction of various conditions, such as passage of a predefined amount of time, travel of a predefined distance, the date being a date defined for transfer of the listener data 124, a storage of listener data 124 reaching a predefined amount of data, and so on.

At operation 204, the station classifier service 126 creates a map of the listener data 124. The map may specify a usage value for each combination of listener and radio station 102, where each of the usage values is indicative of whether the respective listener listened to the respective radio station. For instance, for each set of listener data 124, the station classifier service 126 may generate a map including usage values indicative of which of the available radio stations 102 were listened to by the listener for at least a predefined minimum time (e.g., any time, a minute or five minutes or an amount of time deemed to be beyond the mere scanning of stations, etc.) and which radio stations 102 were not. In another example, the map may indicate usage values specifying a total duration across the listener data 124 of listening to each of the radio stations 102.

At 206, the station classifier service 126 compares the mapped listener behavior to the genre classification 104. In an example, the station classifier service 126 may identify groupings of radio stations 102 that are listened to across the maps. For instance, the station classifier service 126 may analyze the data to identify that listeners of a certain radio station 102 also tend to be listeners of a first set of radio stations 102 but tend not to be listeners of a second set of radio stations 102. In one example, probabilities may be determined for each radio station 102 indicating a likelihood that the listener would also listen to each of the other radio stations 102. Additionally, the station classifier service 126 may utilize the genre classification 104 to determine commonality in the clustered listener behavior as compared to the categories of the genre classification 104. Logically, it would be an assumption that stations within a genre classification 104 are interchangeable by a user, meaning that the listeners overall would have similar likelihood of listening to radio stations 102 within a genre classification 104. Therefore, if there are discrepancies in the clustering of listener behavior as compared to the genre classification 104, it may be inferred that the genre classification 104 is not accounting for one or more aspects of the classification of the radio stations 102.

At operation 208, the station classifier service 126 determines whether the clusters indicate commonality of listening to disparate genres. For instance, in some cases listeners may interchangeably listen to radio stations 102 indicated by the genre classification 104 as being of different genres or subgenres. This similarity may be measured, for instance, as overlap in listener behavior exceeding a predefined threshold amount of similarity in listening to the radio stations 102 of two different genre classifications 104. Similarity between listening to the radio stations 102 of two different genre classifications 104 may be defined in various ways, some non-limiting examples including use of linear dependence/independence techniques, distance measurements using a definition of similarity that relates to amount of listening to radio stations 102 within the genre classifications 104, or machine learning techniques as some examples. The predefined threshold amount may be set according to preference, may be inherent in the clustering technique, or may be according to reaching a predefined amount of similarity in listening, e.g., 90%, 95%. If the clusters of listener behavior indicate commonality of listening to separate genres, control passes to operation 210 to combine the separate genres into a single genre. Otherwise, control continues to operation 212.

FIG. 3 illustrates an example 300 of a map 302 illustrating commonality of listening to disparate genre classifications 104 according to the listener data 124. As shown in the example 300, the map 302 shows that a first set 304 of radio stations 102 listened to in the "Adult Hits" classification overlaps significantly with a second set 306 of radio stations 102 listened to in the "Adult Contemporary" classification. Notably, listeners that listen to radio stations 102 in one of the genre classifications 104 also tend to listen to radio stations 102 in the other genre classification 104. Moreover, listeners that do not listen to radio stations 102 in one of the genre classifications 104 also tend not to listen to radio stations 102 in the other genre classification 104. Accordingly, the station classifier service 126 may determine that these different genres should, in fact, be treated as a combined genre of radio stations 102. For instance, this combined genre classification 104 may be named by combining the names of the genre classifications 104 being combined, e.g., to reclassify these radio stations 102 into a new combined genre classification 104 of "Adult Hits/Adult Contemporary." At 218, the radio stations 102 are reclassified according to the combined genre classifications 104.

Referring back to FIG. 2, at operation 212, the station classifier service 126 determines whether the clusters indicate multiple clusters of listening in a single genre classification 104. For instance, in some cases a portion of the listeners may only listen to one subset of a genre classification 104 while another portion of the listeners may only listen to another subset of the genre classification 104. Similarity between listening to the radio stations 102 of two different genre classifications 104 may be defined as mentioned above, where lack of similarity may be measured, for instance, as overlap in listener behavior being below a predefined threshold amount of similarity in listening to the subgroups of radio stations 102 within a single genre classifications 104. If so, then the clusters of listener behavior may indicate that the genre classification 104 actually includes two different genre classifications 104 of radio stations 102 and control passes to operation 214 to separate the clusters of radio stations 102 in the genre into separate genre classifications 104. The predefined threshold amount may be set according to preference, may be inherent in the clustering technique, or may be defined according to being below a predefined amount of similarity in listening, e.g., 10%, 5%. At 214, the radio stations 102 are reclassified according to the separated genre classifications 104.

FIG. 4 illustrates an example 400 of a map 402 illustrating multiple clusters of listening in a single genre classification 104 according to the listener data 124. As shown in the example 400, the maps 302 shows that a first set 404 of radio stations 102 listened to in the "News" genre classification 104 are only listened to by a first subset of the listeners, while a second set 406 of the radio stations 102 are only listened to by a second subsets of the listeners. Accordingly, the station classifier service 126 may determine that these different radio stations 102 within a single genre should, in fact, be treated as two separate genre classifications 104.

It should be noted that it may be difficult to automatically determine a logical name for subsets carved from a larger genre. For instance, it may not be clear that one of the subsets is liberal news stations while the other subset is conservative news stations. In one example, the subsets may simply be named "News subset 1" and "News subset 2," and may await user action to rename them. In another example, the station classifier service 126 may access another source of genre classification 104 information, such as a website to gain further information about the content of various radio stations 102 to aid in the naming of the genre classification 104. For instance, if the station classifier service 126 identifies a genre classification 104 for one of the radio stations 102 within a subset, that classification may be used for the genre classification 104 as a whole.

At operation 216, the station classifier service 126 provides the updated genre classification 104. In an example, the station classifier service 126 sends the updated genre classification 104 over the wide-area network 116 to the vehicles 106, to allow the vehicles 106 to use the updated genre classification 104. In an example, the vehicles 106 may use the updated genre classification 104 to provide better recommendations to a user of related content. For instance, if a listener is tuned to a radio station 102 and wants to hear similar content, the vehicle 106 may use the updated genre classification 104 to more accurately recommend a similar radio station 102 to the listener. After operation 216, the process 200 ends.

Thus, the histories of the listener data 124 from connected vehicles 106 may be used to associate genres 104 together when many stations 102 share users. By using the listener data 124, coarse genres 104 may be split up and overly-narrow genres 104 may be condensed.

Computing devices described herein generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, JAVA™, C, C++, C #, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a memory configured to store listener data indicative of radio stations listened to by a plurality of listeners and genre classifications of the radio stations; and
a processor programmed to
receive the listener data from a plurality of vehicles;
combine a plurality of the genre classifications into a single combined genre classification responsive to listener behavior across the plurality of listeners indicating overlap in listening to the plurality of the genre classifications;
separate one of the genre classifications into a plurality of separated genre classifications responsive to listener behavior across the plurality of listeners indicating disparate subsets of radio stations within the one of the genre classifications;
reclassify the radio stations according to the genre classifications as updated; and
send the genre classifications as updated to the vehicles.

2. The system of claim 1, wherein the processor is further programmed to:
generate a map from the listener data, the map specifying a usage value for each combination of listener and radio station; and
analyze the usage values of the map to derive the listener behavior.

3. The system of claim 2, wherein each usage value is indicative of whether the respective listener listened to the respective radio station for at least a predefined minimum time.

4. The system of claim 2, wherein each of the usage values is indicative of a total duration of time the respective listener listened to the respective radio station.

5. The system of claim 2, wherein the processor is further programmed to compare the map to the genre classifications to determine genre classifications to combine or genre classifications to separate.

6. The system of claim 1, wherein the processor is further programmed to name the single combined genre based on a concatenation of names of the plurality of the genre classifications being combined.

7. The system of claim 1, wherein the processor is further programmed to name the plurality of separated genre classifications as subcategories of the one of the genre classifications being separated.

8. A method comprising:
receiving, from a plurality of vehicles, listener data indicative of radio stations tuned to by radios of the respective vehicles, each of the radio stations being classified according to one of a plurality of genre classifications;
generating, from the listener data, a map specifying usage values for each combination of vehicle and radio station;
combining a plurality of the genre classifications into a single combined genre classification responsive to the map indicating overlap above a predefined threshold amount among the plurality of vehicles in listening to the plurality of the genre classifications;
separating one of the genre classifications into a plurality of separated genre classifications responsive to the map indicating disparate subsets of radio stations within the one of the genre classifications with overlap below a second predefined threshold amount; and
sending the genre classifications as updated to the plurality of vehicles.

9. The method of claim 8, further comprising setting each usage value to be indicative of whether a respective vehicle is tuned to a respective radio station for at least a predefined minimum time.

10. The method of claim 8, further comprising setting each usage value to be indicative of a total period of time a respective vehicle is tuned to a respective radio station.

11. The method of claim 8, further comprising naming the single combined genre based on a concatenation of names of the plurality of the genre classifications being combined.

12. The method of claim 8, further comprising naming the plurality of separated genre classifications as subcategories of the one of the genre classifications being separated.

13. A non-transitory computer readable medium comprising instructions that, when executed by a processor, cause the processor to:
receive, from a plurality of vehicles, listener data indicative of radio stations tuned to by radios of the respective vehicles, each of the radio stations being classified according to one of a plurality of genre classifications;
generate, from the listener data, a map specifying usage values for each combination of vehicle and radio station;
combine a plurality of the genre classifications into a single combined genre classification responsive to the map indicating overlap among the plurality of vehicles in listening to the plurality of the genre classifications;
separate one of the genre classifications into a plurality of separated genre classifications responsive to the map indicating disparate subsets of radio stations within the one of the genre classifications; and
send the genre classifications as updated to the plurality of vehicles.

14. The medium of claim 13, further comprising instructions that, when executed by the processor, cause the processor to set each usage value to be indicative of whether a respective vehicle is tuned to a respective radio station.

15. The medium of claim 13, further comprising instructions that, when executed by the processor, cause the processor to set each usage value to be indicative of a total period of time a respective vehicle is tuned to a respective radio station.

16. The medium of claim 13, further comprising instructions that, when executed by the processor, cause the processor to name the single combined genre including a concatenation of names of the plurality of the genre classifications being combined.

17. The medium of claim 13, further comprising instructions that, when executed by the processor, cause the processor to name the plurality of separated genre classifications as subcategories of the one of the genre classifications being separated.

\* \* \* \* \*